Patented Mar. 18, 1930

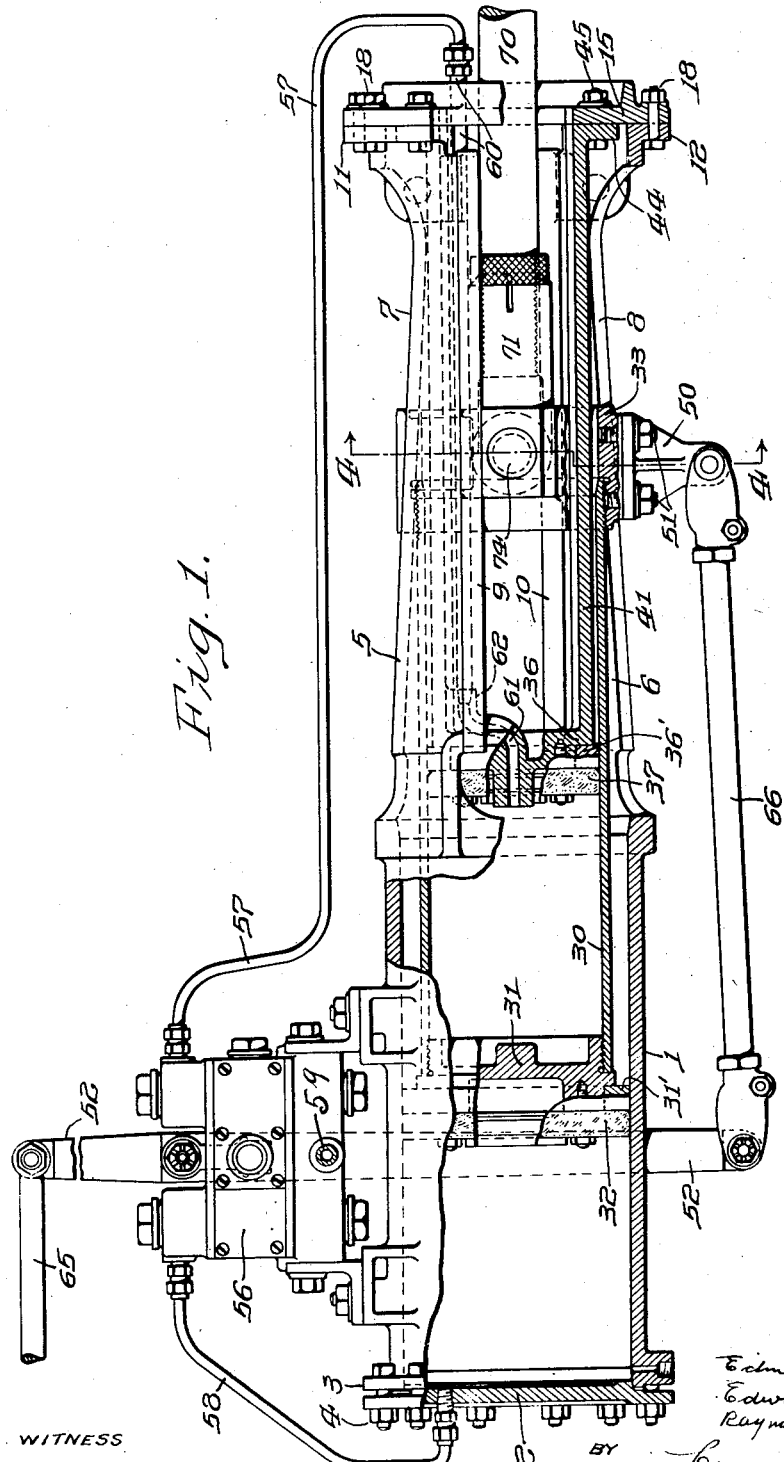

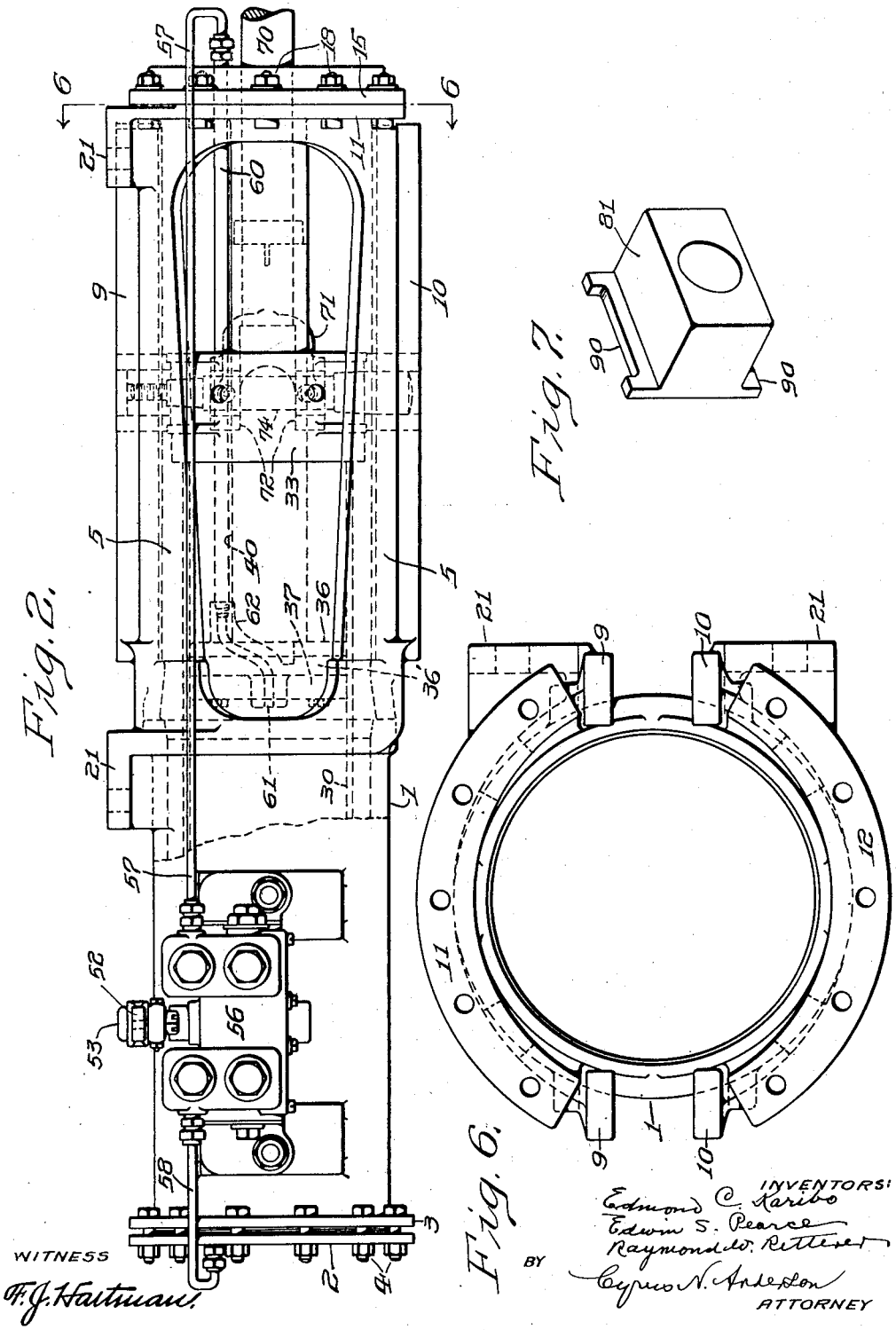

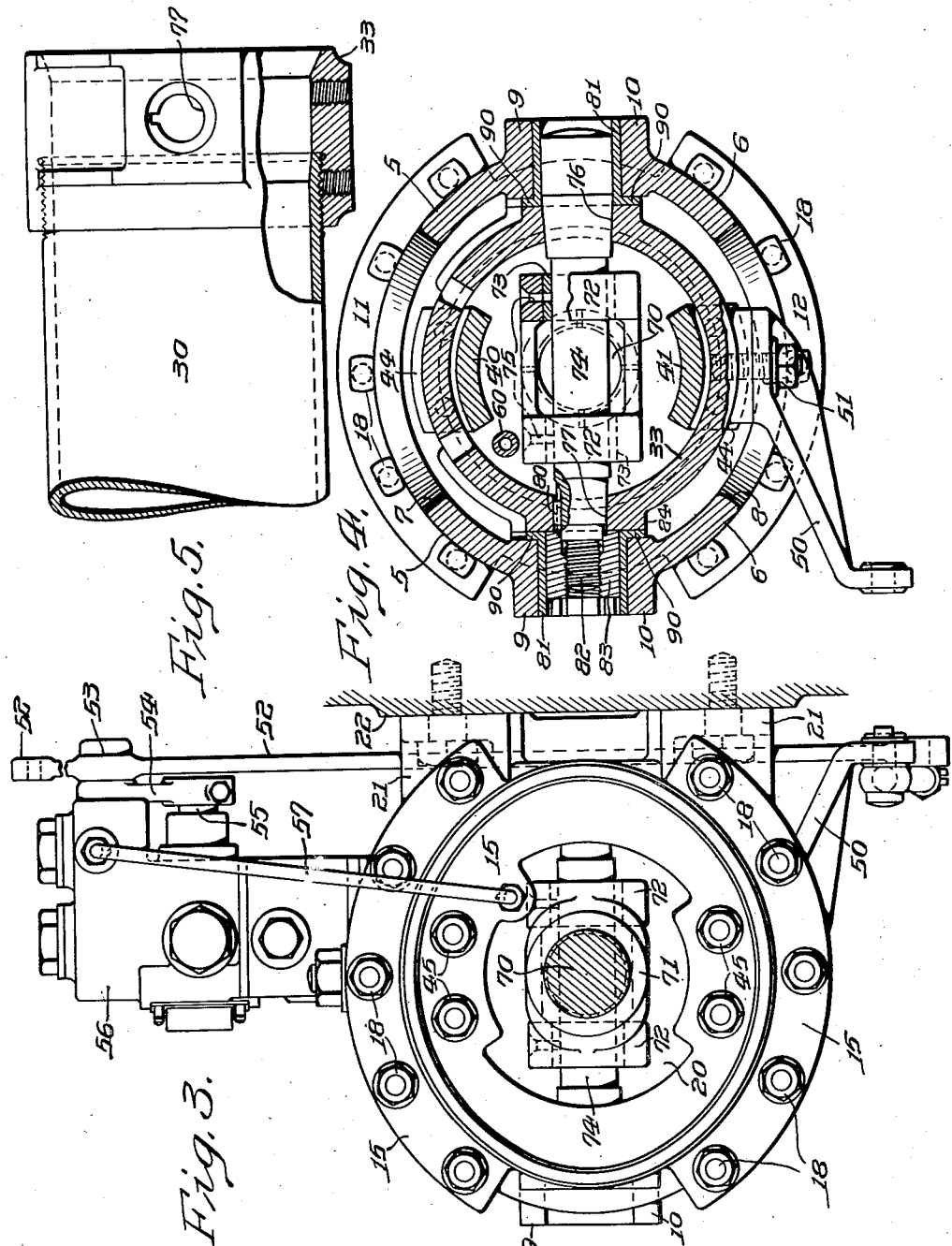

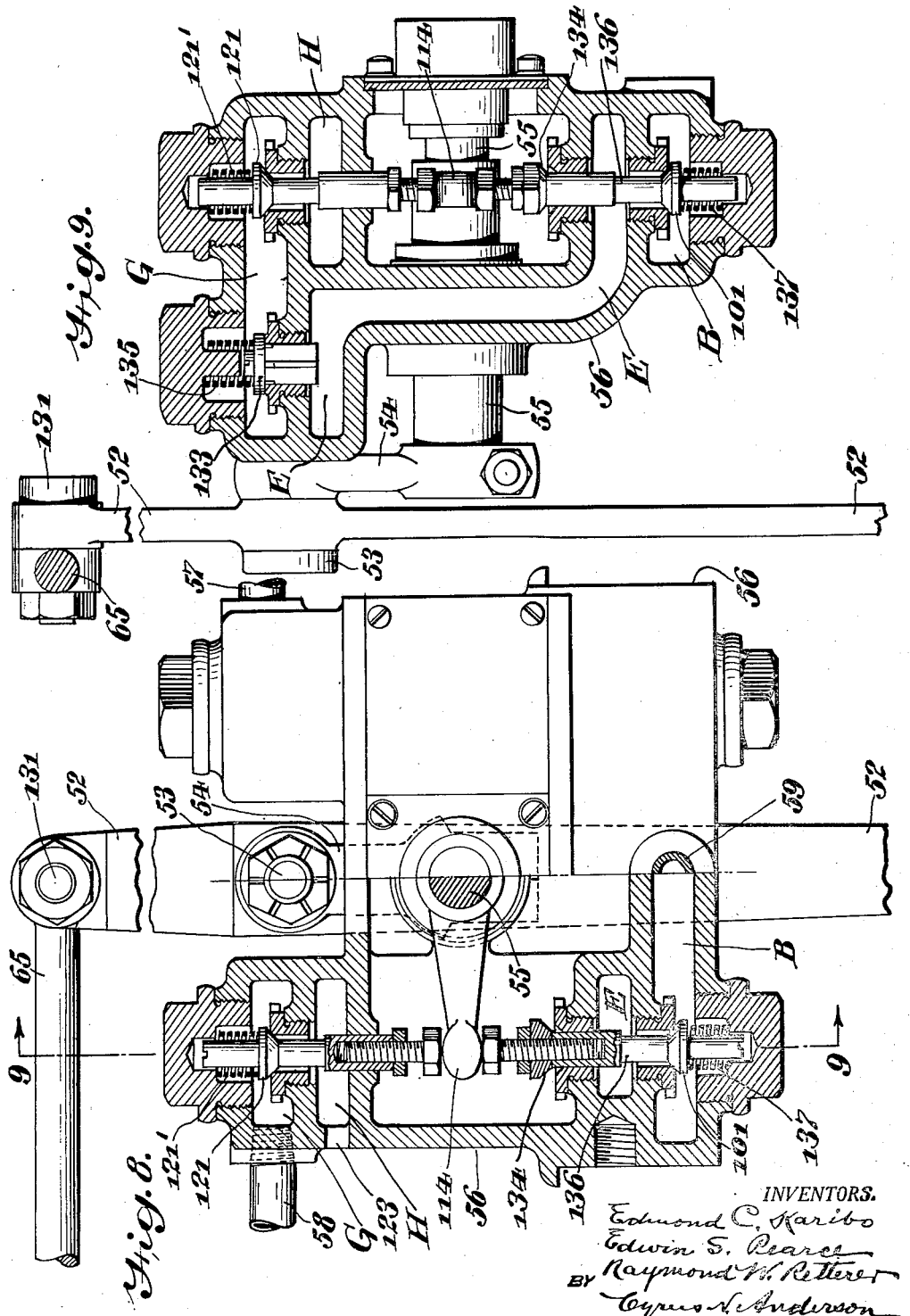

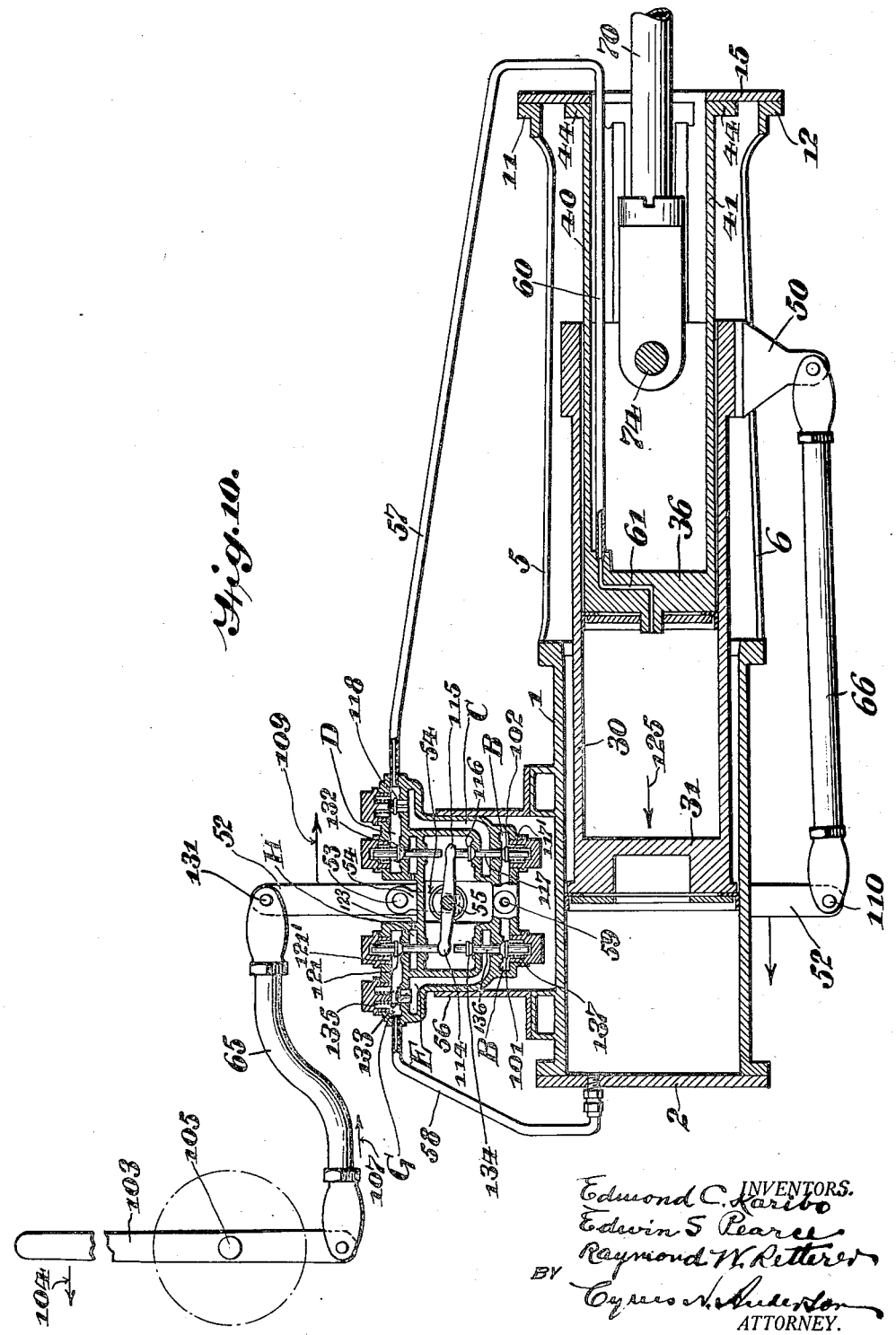

1,751,277

UNITED STATES PATENT OFFICE

EDMOND C. KARIBO, EDWIN S. PEARCE, AND RAYMOND W. RETTERER, OF INDIANAPOLIS, INDIANA, ASSIGNORS TO TRANSPORTATION DEVICES CORPORATION, OF INDIANAPOLIS, INDIANA, A CORPORATION OF INDIANA

POWER-REVERSE-GEAR MECHANISM

Application filed June 22, 1922. Serial No. 570,182.

Our invention relates to power reverse gear mechanism, and it has for its general object to provide a simplified novel construction of such mechanism having various features of mechanical and constructional advantage as will be hereinafter pointed out in detail.

A further object of the invention is to provide an improved construction of stationary cylinder which is provided with means rigidly secured to and carried thereby to which other parts of the apparatus are connected and by means of which certain other parts are supported and guided.

A further object of the invention is to provide a new and novel arrangement and relationship between parts of the stationary cylinder construction and other parts of the mechanism or apparatus.

A still further object of the invention is to provide a novel arrangement of the reach rod of the mechanism with respect to other parts thereof.

Other objects and advantages of the invention will be pointed out in the detailed description thereof which follows or will be apparent from such description.

In order that the construction may be readily understood and its practical and substantial advantages appreciated reference may be had to the accompanying drawings in which a form of construction, at present preferred by us, is illustrated; but it will be understood that the invention is susceptible of embodiment in other forms of construction than that shown and that various changes in the details of construction may be made within the scope of the claims without departing from the said invention.

In the drawings:

Fig. 1 is a view partly in side elevation and partly in longitudinal vertical section of a power reverse gear mechanism embodying the invention;

Fig. 2 is a top plan view thereof;

Fig. 3 is a view in end elevation looking toward the left in Figs. 1 and 2;

Fig. 4 is a transverse sectional view taken on the line 4—4 of Fig. 1;

Fig. 5 is a view in side elevation of the front end portion of the floating cylinder and the floating cylinder ring or cross-head secured thereto, a portion of the cylinder and cross-head ring being broken away and shown in section;

Fig. 6 is a front end elevational view taken on the line 6—6 of Fig. 2;

Fig. 7 is a perspective view of a sliding bearing block for supporting the reach rod wrist pin within guideways upon forwardly projecting extensions from the main or body portion of the stationary cylinder of the mechanism;

Fig. 8 is a view partly in side elevation and partly in vertical section of the valve structure;

Fig. 9 is a vertical sectional view taken on the line 9—9 of Fig. 8; and

Fig. 10 is a schematic vertical and longitudinal sectional view of the mechanism as shown in Figs. 1 and 2 with certain parts of the valve structure displaced from their normal positions in order to show more clearly the construction and operation thereof.

Referring to the drawings: 1 designates a stationary cylinder closed at its rear end by a closing plate or head 2 secured to an annular flange 3 by means of bolts and nuts 4. The cylinder is provided with integral forwardly extending or projecting portions 5 and 6 which, for the greater part of their length, are slightly tapered, as indicated, and which are curvilinear in cross section. The upper extension 5 is provided with an opening 7 while the lower projection 6 is provided with an opening 8. The edges of the projections are provided with flange or bar like portions 9 and 10 as shown which are spaced from each other and are parallel to form guideways for the purpose hereinafter stated. The front ends of the forward extensions 5 and 6 are enlarged or flared outwardly, as shown, and terminate in flanges 11 and 12 to which is secured a front plate 15 by means of bolts and nuts 18. The said plate is provided with a central irregularly shaped opening 20, as shown in Fig. 3 of the drawings. The said cylinder 1 and the extensions 5 and 6 are provided with brackets 21 by means of which the mechanism is secured to and supported upon a locomotive, a fragmentary portion of which is shown at 22.

A floating or reciprocable cylinder 30 is situated and operates within the stationary cylinder 1. The said cylinder is provided at its inner or rear end with a closing head portion 31 provided with a bearing ring 31' and with packing means, indicated as a whole at 32, by which the joint or connection between the inner or rear end of the cylinder 30 and the interior surface of the stationary cylinder 1 is rendered steam or air tight.

The cross-head ring 33 is secured to the front end of the floating cylinder 30. For the purpose of connecting the said ring to the floating cylinder it is provided upon its inner rear side with a screw threaded portion, as indicated, which is adapted to screw onto the externally screw threaded front end portion of the said cylinder 30. Situated within the floating cylinder 30 is a stationary piston head 36 provided upon its rear end portion with a bearing ring 36' and with a suitable packing which is indicated as a whole at 37, which packing is of a character to form between the said piston head and the interior surface of the floating cylinder 30 a steam or air tight joint. The said piston head is provided with forwardly extending curvilinear top and bottom connecting bars 40 and 41, the front ends of which terminate in laterally and outwardly extending flanges 44 which are secured to the plate 15 by means of bolts and nuts 45.

A bracket arm 50 is secured by means of bolts 51 to the cross-head ring 33, which arm extends laterally, as indicated in Figs. 3 and 4, so that its outer lower end is in substantial alinement with the lower end of a floating lever 52 which is pivoted intermediate its ends at 53 to the upper end of an arm 54 mounted upon a shaft 55 which extends into the valve casing 56 within which are included channels with which the pipes 57 and 58 are in communication. Valves are also included within the said valve casing for the purpose of controlling the passage of steam, air or other suitable fluid through the pipes 57 and 58 for supplying and exhausting such steam, air or other fluid to and from the chambers within the floating and stationary cylinders. The steam or air is supplied through an inlet 59 in the valve casing to the valve controlled passageways therein.

The pipe 58 extends rearwardly from the valve casing, as shown, and is connected with the head 2 and communicates therethrough with the interior of the stationary cylinder 1. The pipe 57 extends forwardly from the cylinder casing and its front end portion is bent downwardly and reversely and is connected with the forward end of a pipe 60 the front end of which projects through the head plate 15. The said pipe 60 extends rearwardly within the space between the upper and lower bars 40 and 41 of the stationary piston 36, and its rear end is connected within the forward end of a passageway 61 which extends through the stationary piston head 36. The forward upper end of the passageway 61 terminates in an eccentrically situated forwardly extending projection 62 while the lower end thereof terminates at a point substantially concentric with the said stationary piston head 36.

The floating lever 52 is adapted to be operated to control the valves within the valve casing 56 by means of a power reverse reach rod 65 connected to its upper end. Operation of said lever controls the passage of steam, air or other fluid through the pipes 57 and 58 into and from the chambers within the floating cylinder 30 and the stationary cylinder 1. The chamber of the floating cylinder referred to is that between the head 31 and the piston head 36 within the floating cylinder while the chamber of the stationary cylinder referred to is that between the head 2 of the stationary cylinder and the head 31 of the floating cylinder.

The lower end of the floating lever 52 is connected by means of a connecting rod 66 with the outer lower end of the bracket 50 carried upon the cross-head ring 33 secured to the front end of the floating cylinder 30, as hereinbefore described.

The forward end of the reach rod 70 is connected with the reverse shaft arm (not shown). The rear end thereof is provided with a head 71 secured thereto, the rear end of which is bifurcated so as to provide spaced portions 72 which have openings lined with bearing rings 73 through which the tapered cross-head wrist pin 74 extends. Lubrication of these bearing rings may be effected through the openings 75. The opposite end portions of the said pin extend through openings 76 and 77 in the opposite sides of the cross-head ring 33. A key 80, which engages slots in both the said ring and the said pin, prevents rotation of the latter within the openings in said ring. At its larger end the pin 74 is provided with an enlargement or head, the outer end portion of which extends through an opening through a bearing block 81 having a portion of rectangular shape which is situated between the guides 9 and 10 shown at the right hand side of Fig. 4 of the drawings. The opposite reduced end portion of the said pin is provided with a screw threaded section 82 with which is engaged a retaining nut 83, the inner end of which is adapted to contact with the outer surface of a projection 84 on the cross-head ring 33 so that when the said nut is screwed inwardly upon the screw threaded section 82 it draws or pulls the said pin inwardly so as to cause the tapered inner section of the head at the opposite end of the wrist pin to fit closely within the opening through the ring 33 in which it is situated. The nut 83 is situated within a bearing block 81 identical with the corresponding block at the opposite side of the structure. This second named block likewise is slidably situated between the guides 9 and 10 shown at the left hand side of Fig. 4 of the drawings. Both of the said blocks are provided with oppositely disposed flanges 90 at their opposite inner edges which contact with and slide against the inner edges of the guides 9 and 10.

We shall now refer particularly to Figs. 8 to 10 inclusive of the drawings and in connection therewith describe briefly the valve construction as well as the operation of the mechanism as a whole. It may be noted here that the illustration in Fig. 10 is more or less schematic in form and is intended primarily to facilitate an understanding of both the construction and operation of the mechanism. As already stated, certain parts of the structure are shown in this figure as being displaced from their normal positions.

In the operation of the device air or other fluid enters the valve casing 56 through the inlet 59 and fills the chamber B. The air which enters the chamber B is retained therein until it is desired to permit it to escape by means of valves 101 and 102. If the reach rod 70 is to be moved to the left to cause the locomotive to move with a backing motion the lever 103 is moved to the left, that is, in the direction of the arrow 104. In moving in this direction the said lever rotates about its fulcrum 105. Its lower end moves to the right and causes movement of the power reverse reach rod 65 in a like direction, as indicated by the arrow 107. The first portion of this movement causes movement of the floating lever 52 in a direction toward the right, as indicated by the arrow 109, about the pin 110 as a fulcrum. The pin 110 connects the lower end of the floating lever 52 to the rear end of the connecting rod 66. The floating lever 52 is connected by a pin at 53 to the upper end of the arm 54 which is rigidly connected with the shaft 55 which extends through the valve casing so that when the floating lever 52 is moved toward the right in the direction of the arrow 109 the said shaft is rotated slightly in a clockwise direction and causes a corresponding movement of the rocker arms 114 and 115. These arms in the construction as shown are integral with the shaft 55 though they may be otherwise rigidly connected therewith. In its movement the rocker arm 115 contacts with and causes downward movement of the inlet valve 102 to open the same and allow air or other fluid to escape from the chamber B into the chamber C. At the same time the valve 116 secured upon the valve stem 117 near its upper end is closed. The valve 102 is also secured to the valve stem 117 near its lower end. The valve 102 is normally held in closed position and the valve 116 in open position by the action of a coiled spring 117′ the upper end of which bears against the lower side of the said valve 102. Closing of the valve 116 prevents escape of the air or other fluid from the chamber C previously referred to. The air or other fluid under pressure which enters the chamber C acts upon the check valve 118 to open the same and passes or flows from the chamber C into the chamber D and thence through the pipe 57, 60 and port or opening 61 into the chamber within the floating cylinder 30 between the head 31 of the latter and the head of the stationary piston head 36. Simultaneously with the opening of the valve 102 and the closing of the valve 116 by the rocker arm 115 the oppositely extending rocker arm 114 contacts with the lower end of the stem of the exhaust valve 121 and elevates the same to open it. Normally the said valve is held in closed position by the action of a coiled spring 121′. Upon opening of the exhaust valve 121 air or other fluid under pressure is permitted to escape from the stationary cylinder 1 through the pipe 58 into the chamber G and thence beyond the valve 121 into the chamber H and thence through the opening 123 to the atmosphere.

Permitting the outflow through the pipe 58 of air or other fluid under pressure from the stationary cylinder 1 and simultaneously supplying air or other fluid under pressure to the floating cylinder 30 cause the latter to move toward the left in the direction of the arrow 125. Such movement carries with it the cross-head pin 74, the reach rod 70, and the bracket 50. The bracket 50 is connected by the connecting rod 66 and by a pin 110 to the lower end of the floating lever 52 so that as a result of movement of the floating cylinder toward the left, as above described, corresponding movement of the lower end portion of the floating lever 52 is effected. If slight pressure is exerted upon the reverse lever 103 in the direction of the arrow 104 the valves will be continued in the position just previously described and the floating cylinder will be moved to the left end of its stroke. Should this pressure against the reverse lever 104 be removed the pin 131 by which the upper end of the floating lever 52 is connected to the forward end of the power reverse reach rod 65 will become a stationary fulcrum point. The floating cylinder 52 will continue its movement toward the left in the direction of the arrow 125 to cause sufficient pivotal movement of the floating lever 52 about the said fulcrum to effect rotation of the arm 54, the shaft 55, and the rocker arms 114 and 115 in an anti-clockwise direction into neutral position. In this position all of the valves, 101, 102, 121 and 132 are seated so that the floating cylinder and its connections are held in stationary position. When the valves are in this condition the check valves 118 and 133 retain air or other fluid in the floating and stationary cylinders 30.

In order to obtain operation of the mechanism in the reverse of that just described movement of the reverse lever 3 is effected in the reverse direction to that above described, causing the shaft 55 and the rocker arms 114 and 115 rigidly connected therewith to rock or move in an anti-clockwise direction, thereby opening the valve 101 and simultaneously closing the valve 134. These valves are mounted on the valve stem 136. Normally the valve 101 is held in closed position while the valve 134 is held in open position by the action of a coiled spring 137 pressing upwardly against the lower side of the valve 101. Simultaneously with the opening of the valve 101 and the closing of the valve 134 the valve 132 is opened. As a result of this operation air or other fluid under pressure passes from the chamber B past the valve 101 into the chamber E and thence past the check valve 133 (normally held in closed position by the action of a spring 135), into the chamber G, and thence through the pipe 58 into the stationary cylinder 1. Simultaneously the air or other fluid under pressure is permitted to escape from the floating cylinder 30, through the pipe 60, 57, into the chamber D, and past the valve 132 and thence to the atmosphere.

It will be observed that the means for supporting the front end portions of the connecting bars 40 and 41 which extend forwardly from the stationary piston head 36 is supported by the integral extensions 5 and 6 which extend forwardly from the stationary cylinder 1; also that the forward portion of the floating cylinder and cross-head ring 33 are supported by means of the said extensions, which support is effected by means of the cross-head wrist pin 74, the opposite ends of which extend through the said cross-head ring and the guides 9 and 10 at the opposite sides of the said extensions.

It will also be noted that the reach rod 70, the forward end of which is connected to the reverse shaft arm referred to, is situated in substantial alinement with the longitudinal axis of the mechanism; that is to say, in longitudinal alinement with axes of the stationary and floating cylinders 1 and 30 and the stationary piston head 36. In consequence of this relationship the force exerted by the floating cylinder to effect longitudinal movement of the reach rod 70 to actuate the parts operated and intended to be operated thereby is directly and concentrically, so to speak, applied so that the said force or the reaction thereof has no tendency to bind the floating cylinder within the stationary cylinder or against the portions of the mechanism which guide and support the same.

It will be seen that by our invention we have provided a structure which is simple, compact and rigid, and which obviously affords many desirable practical advantages.

Having thus described our invention what we claim and desire to secure by Letters Patent is:

1. In a power reverse gear mechanism, the combination of a stationary cylinder having oppositely disposed projections which extend forwardly therefrom, the forward ends of which are provided with outwardly extending flanges, a head plate secured to said flanges, a floating cylinder projecting into the said stationary cylinder, which floating cylinder is provided at its outer end with a cross-head ring member, bearing blocks situated and slidable within the spaces between the said forwardly extending projections, a wrist pin extending through the said cross-head and supported at its opposite ends within the said bearing blocks, a reach rod having connection with the said wrist pin and extending forwardly therefrom in co-axial relation with respect to the said floating cylinder, and a stationary piston operating in said floating cylinder.

2. In a power reverse gear mechanism, the combination of a stationary cylinder having a closed and an open end, a floating cylinder having a closed and an open end the former of which projects into the open end of said stationary cylinder, means for supplying an operating fluid to the said stationary cylinder and to the said floating cylinder on opposite sides of the closure of the closed end of the latter, a stationary piston which projects into the open end of said floating cylinder, a reach rod, and means for connecting it to the forward open end of the floating cylinder in concentric relation thereto.

3. In a power reverse gear mechanism, the combination of a stationary cylinder, a floating cylinder having a closed end which projects into the said stationary cylinder, a stationary piston situated within the said floating cylinder, the said piston having supporting members extending forwardly therefrom, means for supporting the forward ends of said members, means for controlling the ingress and egress of an operating fluid to and from the stationary and floating cylinders, a pipe connection leading from the said means to the floating cylinder, the said last mentioned connection comprising a pipe which has connection with an opening which extends through the piston head.

4. In a power reverse gear mechanism, the combination of a stationary cylinder having projections extending forwardly therefrom, which projections are provided with guides, a bracing plate connected with the rear ends of said projections, said plate having a centrally situated opening therethrough, a floating cylinder having a closed end which projects into the said stationary cylinder, a stationary piston head situated within the said floating cylinder, said piston head having supporting bars extending rearwardly therefrom and connected to the said bracing plate, means for controlling the ingress and egress of an operating fluid to and from the stationary and floating cylinders, a pipe connection between said means and a stationary cylinder and a pipe connection between said mechanism and the said floating cylinder, the said last mentioned connection comprising a pipe supported at its forward end in the said brace plate and having connection at its rear end with a passageway through the said piston head, substantially as described.

5. In a power reverse gear mechanism, the combination of a stationary cylinder having forwardly extending projecting portions spaced from each other to form guideways, a floating cylinder, a pin extending transversely of and having connection with the forward end of said cylinder, bearing blocks mounted within said guideways within which blocks the opposite ends of said pin are mounted, a stationary piston situated within the said floating cylinder and having forwardly extended bars which are connected at their outer ends with the outer ends of the said projecting portions, and a reach rod having pivotal connection with the said pin and extending forwardly therefrom in axial alinement with the said floating cylinder.

In testimony that we claim the foregoing as our invention we have hereunto signed our names this 13 day of June, A. D. 1922.

EDMOND C. KARIBO.
EDWIN S. PEARCE.
RAYMOND W. RETTERER.